United States Patent
Xie

(10) Patent No.: US 10,419,742 B2
(45) Date of Patent: Sep. 17, 2019

(54) METHOD AND DEVICE FOR CAPTURING IMAGE AND STORAGE MEDIUM

(71) Applicant: ZTE Corporation, Shenzhen, Guangdong (CN)

(72) Inventor: Zhongkun Xie, Shenzhen (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 256 days.

(21) Appl. No.: 15/527,735

(22) PCT Filed: Mar. 18, 2015

(86) PCT No.: PCT/CN2015/074451
§ 371 (c)(1),
(2) Date: May 18, 2017

(87) PCT Pub. No.: WO2016/078266
PCT Pub. Date: May 26, 2016

(65) Prior Publication Data
US 2019/0158814 A1    May 23, 2019

(30) Foreign Application Priority Data
Nov. 18, 2014  (CN) .......................... 2014 1 0658335

(51) Int. Cl.
*G01B 11/24* (2006.01)
*G06T 15/00* (2011.01)
(Continued)

(52) U.S. Cl.
CPC .......... *H04N 13/275* (2018.05); *G01B 11/24* (2013.01); *G06T 3/005* (2013.01); *G06T 15/00* (2013.01);
(Continued)

(58) Field of Classification Search
None
See application file for complete search history.

(56) References Cited

U.S. PATENT DOCUMENTS 8,988,381 B1 * 3/2015 Kim ...................... G06F 1/1652
345/108
2007/0009222 A1    1/2007 Koo
(Continued)

FOREIGN PATENT DOCUMENTS

CN    101925874 A    12/2010
CN    103489372 A    1/2014
(Continued)

OTHER PUBLICATIONS

International Search Report in international application No. PCT/CN2015/074451, dated May 29, 2015, 2 pgs.
(Continued)

*Primary Examiner* — Fernando Alcon
(74) *Attorney, Agent, or Firm* — Cooper Legal Group, LLC

(57) ABSTRACT

Disclosed is a method for capturing an image, comprising: receiving an image capturing instruction, and acquiring an image capturing zone and an image capturing parameter according to the image capturing instruction; measuring a bending parameter of the image capturing zone, when the image capturing zone is determined as a curved surface according to the bending parameter, acquiring a three-dimensional spatial coordinate of pixel points in the image capturing zone and a color value of the pixel points in the image capturing zone; and projecting the three-dimensional spatial coordinate to a two-dimensional planar coordinate, and the two-dimensional planar coordinate generating an image file according to the image capturing parameter and the color value of the pixel points in the image capturing
(Continued)

zone. Also disclosed are a device for capturing an image and a storage medium.

20 Claims, 2 Drawing Sheets

(51) Int. Cl.
*H04N 13/257* (2018.01)
*H04N 13/275* (2018.01)
*G06T 3/00* (2006.01)
*G06T 19/00* (2011.01)

(52) U.S. Cl.
CPC ........ *G06T 19/00* (2013.01); *G06T 2219/021* (2013.01)

(56) References Cited

U.S. PATENT DOCUMENTS

| | | | |
|---|---|---|---|
| 2007/0247422 A1 | 10/2007 | Vertegaal | |
| 2008/0278461 A1* | 11/2008 | Prat | G06F 3/0414 345/176 |
| 2009/0189917 A1 | 7/2009 | Benko | |
| 2010/0045705 A1 | 2/2010 | Vertegaal | |
| 2010/0056223 A1* | 3/2010 | Choi | G06F 1/1601 455/566 |
| 2010/0060548 A1* | 3/2010 | Choi | G06F 3/0414 345/1.3 |
| 2012/0112994 A1 | 5/2012 | Vertegaal | |
| 2013/0093660 A1* | 4/2013 | Hirsch | G06F 1/1652 345/156 |
| 2013/0127748 A1 | 5/2013 | Vertegaal | |
| 2013/0154971 A1 | 6/2013 | Kang et al. | |
| 2013/0215088 A1* | 8/2013 | Son | G09G 5/40 345/204 |
| 2013/0222222 A1* | 8/2013 | Arrasvuori | G06T 19/00 345/156 |
| 2013/0328764 A1 | 12/2013 | Chon et al. | |
| 2014/0085184 A1 | 3/2014 | Vertegaal | |
| 2014/0111417 A1 | 4/2014 | Son | |
| 2017/0262134 A1* | 9/2017 | Eriksson | G06F 3/017 |

FOREIGN PATENT DOCUMENTS

| | | |
|---|---|---|
| CN | 104115096 A | 10/2014 |
| JP | 2000030067 A | 1/2000 |
| JP | 2002077578 A | 3/2002 |
| JP | 2002150280 A | 5/2002 |
| JP | 2004040395 A | 2/2004 |
| JP | 2008287426 A | 11/2008 |
| JP | 2010164869 A | 7/2010 |
| JP | 2012027563 A | 2/2012 |
| JP | 2013105312 A | 5/2013 |
| JP | 5292314 B2 | 9/2013 |
| JP | 2014157324 A | 8/2014 |
| WO | 2005041125 A1 | 5/2005 |

OTHER PUBLICATIONS

English Translation of the Written Opinion of the International Search Authority in international application No. PCT/CN2015/074451, dated May 29, 2015, 5 pgs.

Supplementary European Search Report in European application No. 15862055.9, dated Oct. 18, 2017, 8 pgs.

"A Handheld Flexible Display System", Oct. 2005, Jonathan Konieczny, Clement Shimizu, Gary Meyer and D'Nardo Colucci, IEEE Visualization, pp. 591-597.

"A Rendering Method for Multi Projection Display with Curved Screen" Jun. 2003, Naoki Hashimoto, Masaya Kurahashi and Makoto Sato, Institute of Image Information and Television Engineers Technical Report, vol. 27, No. 31, pp. 1-10. Entire document in Japanese with Abstract in English on p. 4.

* cited by examiner

METHOD AND DEVICE FOR CAPTURING IMAGE AND STORAGE MEDIUM

TECHNICAL FIELD

The disclosure relates to an image processing technology, and in particular, to a method and device for capturing image, and a storage medium.

BACKGROUND

With the rapid development of electronic technology, electronic devices are widely applied in various fields of daily life. The flexibly display technology becomes a development hotspot of the screen technology of electronic devices, because of special curved-surface display effect of the flexibly display technology. Various major mobile terminal manufactures and video output device manufactures race to launch curved-surface display mobile terminals and curved-surface video output devices. The curved-surface display mobile terminals and curved-surface video output devices have their respective flexible screens. The flexible screen can be bent, folded and curled to deform. The screen image capturing function of the mobile terminal and the video output device is convenient for a mobile terminal user and a video output user to record and share information, thereby making it more interesting for the mobile terminal user and the video output user.

The flexible screen has a three-dimensional display effect. However, the existing screen image capturing technology can only acquire a two-dimensional planar image of image pixel points, but cannot describe the three-dimensional display effect of the flexible screen accurately. As such, how to realize image capturing of the flexible screen is a problem to be solved.

SUMMARY

In view of this, an embodiment of the disclosure is intended to provide a method and device for capturing an image and a storage medium, which can realize image capturing of a flexible screen.

The technical solutions of the disclosure are implemented as follows.

A method for capturing an image is provided, which includes that: an image capturing instruction is received, and an image capturing zone and image capturing parameters are acquired according to the image capturing instruction; at least one bending parameter of the image capturing zone is measured, and when the image capturing zone is determined as a curved surface according to the at least one bending parameter, three-dimensional spatial coordinates of pixel points in the image capturing zone and color values of the pixel points in the image capturing zone are acquired; and the three-dimensional spatial coordinates are projected to two-dimensional planar coordinates, and the two-dimensional planar coordinates are generated into an image file according to the image capturing parameters and the color values of the pixel points in the image capturing zone.

In the above solution, the step that the three-dimensional spatial coordinates of the pixel points in the image capturing zone are acquired includes that: a curved surface equation of the image capturing zone is obtained by performing interpolation fitting on the image capturing zone according to the at least one bending parameter, and the three-dimensional spatial coordinates of the pixel points in the image capturing zone are calculated according to the curved surface equation.

In the above solution, the step that the three-dimensional spatial coordinates are projected to the two-dimensional planar coordinates includes that: the three-dimensional spatial coordinates are projected to the two-dimensional planar coordinates according to the image capturing parameters.

In the above solution, the step that the two-dimensional planar coordinates are generated into the image file according to the image capturing parameters and the color values of the pixel points in the image capturing zone includes that: according to the color values of the pixel points in the image capturing zone, the two-dimensional planar coordinates are generated into the image file through a hidden surface removing algorithm and a rendering algorithm indicated by the image capturing parameters.

In the above solution, when a screen for displaying the image can be adjusted to be bent, the three-dimensional spatial coordinates of the pixel points in the image capturing zone are acquired in real time.

A device for capturing an image is also provided, which includes an image capturing module, an image detecting module and an image processing module.

The image capturing module is configured to receive the image capturing instruction, and acquire the image capturing zone and the image capturing parameters according to the image capturing instruction.

The image detecting module is configured to measure the at least one bending parameter of the image capturing zone, and when the image capturing zone is determined as the curved surface according to the at least one bending parameter, acquire the three-dimensional spatial coordinates of pixel points in the image capturing zone and color values of the pixel points in the image capturing zone.

The image processing module is configured to project the three-dimensional spatial coordinates to the two-dimensional planar coordinates, and generate the two-dimensional planar coordinates into an image file according to the image capturing parameters and the color values of the pixel points in the image capturing zone.

In the above solution, the image detecting module is specifically configured to obtain the curved surface equation of the image capturing zone by performing interpolation fitting on the image capturing zone according to the at least one bending parameter, and calculate the three-dimensional spatial coordinates of the pixel points in the image capturing zone according to the curved surface equation.

In the above solution, the image processing module is specifically configured to project the three-dimensional spatial coordinates to the two-dimensional planar coordinates according to the image capturing parameters.

In the above solution, the image processing module is specifically configured to, according to the color values of the pixel points in the image capturing zone, generate the two-dimensional planar coordinates into the image file through the hidden surface removing algorithm and the rendering algorithm indicated by the image capturing parameters.

In the above solution, when the screen for displaying the image can be adjusted to be bent, the three-dimensional spatial coordinates of the pixel points in the image capturing zone are acquired in real time.

A computer storage medium is also provided, in which computer executable instructions are stored; the computer executable instruction is used for performing the method for capturing an image.

According to the method and device for capturing an image, and the storage medium which are provided by an embodiment of the disclosure, the image capturing instruction is captured, and the image capturing zone and the image capturing parameters are acquired according to the image capturing instruction; the at least one bending parameter of the image capturing zone is measured, and when the image capturing zone is determined as a curved surface according to the at least one bending parameter, the three-dimensional spatial coordinates of the pixel points in the image capturing zone and the color values of the pixel points in the image capturing zone are acquired according to the measurement result; and the three-dimensional spatial coordinates are projected to the two-dimensional planar coordinates, and the two-dimensional planar coordinates are generated into the image file according to the image capturing parameters and the color values of the pixel points in the image capturing zone. In such a manner, image capturing of the flexible screen is realized by measuring the at least one bending parameter of a curved surface capturing zone, and generating the two-dimensional planar coordinates into the image file after acquiring the three-dimensional spatial coordinates of the pixel points in the image capturing zone according to the at least one bending parameter and projecting the three-dimensional spatial coordinates to the two-dimensional planar coordinates.

DETAILED DESCRIPTION

In the embodiment of the disclosure, an image capturing instruction is received. An image capturing zone and image capturing parameters are acquired according to the image capturing instruction. At least one bending parameter of the image capturing zone is measured. When the image capturing zone is determined as a curved surface according to the at least one bending parameter, three-dimensional spatial coordinates of pixel points in the image capturing zone and color values of the pixel points in the image capturing zone are acquired according to the measurement result. The three-dimensional spatial coordinates are projected to two-dimensional planar coordinates, and the two-dimensional planar coordinates are generated into an image file according to the image capturing parameters and the color values of the pixel points in the image capturing zone.

Figure 1:
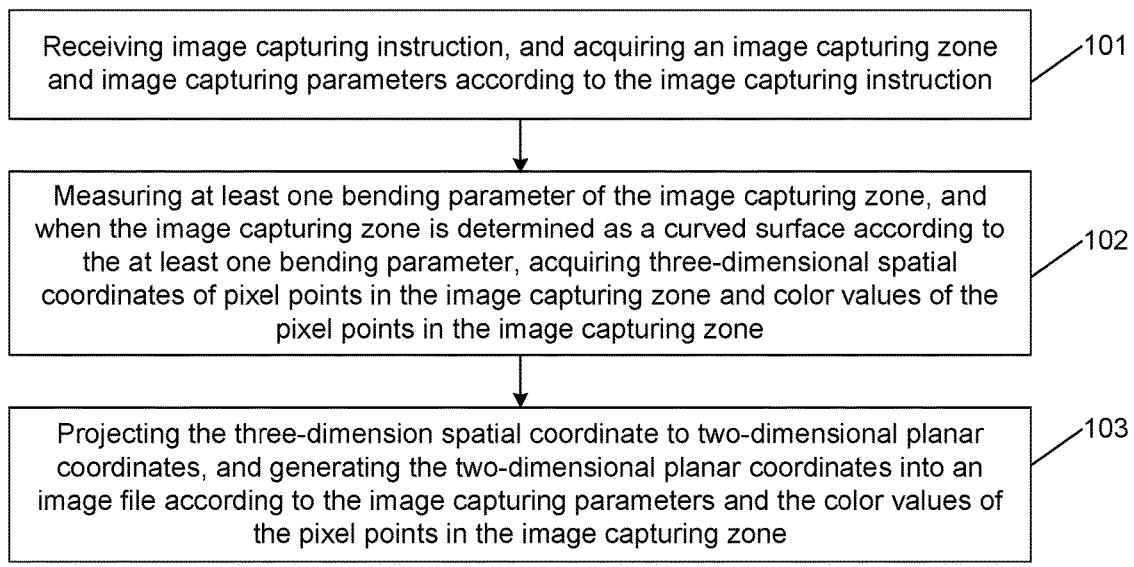
FIG. 1 is a flowchart of a method for capturing an image according to an embodiment of the disclosure.

As shown in FIG. 1, the processing flow of the method for capturing an image according to an embodiment of the disclosure includes the following steps.

In a step 101, an image capturing instruction is received, and an image capturing zone and image capturing parameters are acquired according to the image capturing instruction.

Here, the image capturing instruction includes: a touch screen gesture, a key combination or other detectable image capturing instructions initiated by a device user.

Specifically, a monitoring unit in an image capturing module monitors the image capturing instruction, encapsulates the monitored image capturing instruction into an image capturing message, and then sends the message to a serving unit in the image capturing module. The serving unit parses the image capturing message, and acquires the image capturing zone and the image capturing parameters from the image capturing instruction.

The image capturing parameters are preset in a device of which an image is to be captured. The image capturing parameters include a three-dimensional image projection algorithm, a projection angle, a rendering algorithm and so on.

In a step 102, at least one bending parameter of the image capturing zone is measured, and when the image capturing zone is determined as a curved surface according to the at least one bending parameter, three-dimensional spatial coordinates of pixel points in the image capturing zone and color values of the pixel points in the image capturing zone are acquired.

Specifically, an image detecting module forms a grid sampling system by setting multiple sampling points on the surface of the device screen of which an image is to be captured, and obtains the at least one bending parameter of the image capturing zone by calculating the at least one bending parameter of the grid sampling system. When the at least one bending parameter is 0, the image capturing zone is determined as a plane. When the at least one bending parameter is not 0, the image capturing zone is determined as a curved surface.

The image detecting module can be set on the surface or edge of the device screen. The unit of the image detecting module for measuring the at least one bending parameter of the image capturing zone may be a linear bending sensing unit, a strain gauge sensing unit and an optical fiber curvature sensing unit. When the unit for measuring the at least one bending parameter of the image capturing zone is the linear bending sensing unit and the strain gauge sensing unit, the at least one bending parameter of the image capturing zone is measured according to the change of resistance value of the linear bending sensing unit and the strain gauge sensing unit. When the unit for measuring the at least one bending parameter of the image capturing zone is the optical fiber curvature sensing unit, the at least one bending parameter is curvature and torsion angle.

Figure 2:
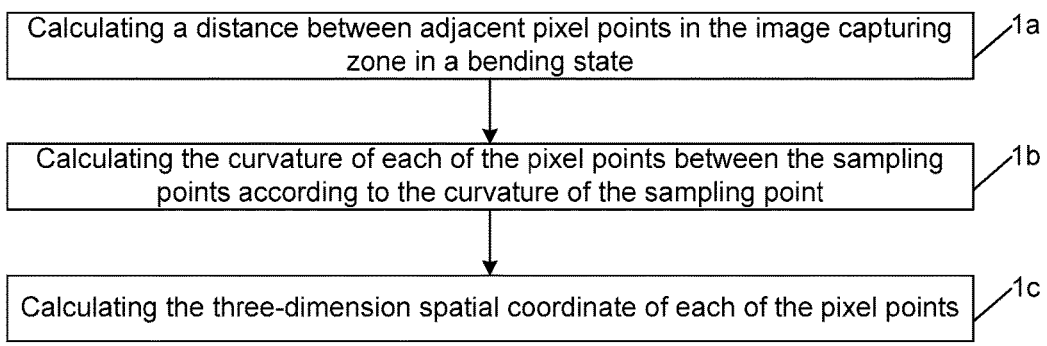
FIG. 2 is a flowchart of acquiring three-dimensional spatial coordinates of pixel points in an image capturing zone in real time according to an embodiment of the disclosure.

In the embodiment of the disclosure, how to acquire the color values of the pixel points in the image capturing zone belongs to the prior art, so it will not be repeated here. When the image capturing zone is determined as a flexible curved surface, as shown in FIG. 2, the processing flow of acquiring three-dimensional spatial coordinates of the pixel points in the mage capturing zone in real time includes the following steps.

In a step 1a, a distance between adjacent pixel points in the image capturing zone in a bending state is calculated.

Specifically, the image detecting module measures curvature values of discrete sampling points, and sets the coordinate at the lower-left corner of the device screen as the origin coordinate (0, 0, 0). Because the pixel points in the flexible screen are distributed uniformly, the distance between any adjacent pixel points in the horizontal direction or the vertical direction is the same. ΔS represents the distance between the adjacent pixel points. The distance between the adjacent pixel points can be calculated according to the known screen size and screen pixel.

In a step 1b, the curvature of each of the pixel points between the sampling points is calculated according to the curvatures of the sampling points.

Specifically, because the curvatures of the points in the curve are consecutive, the curvatures of the pixel points between the sampling points are calculated by adopting a linear interpolation algorithm as follows:

$$K_i = a*\Delta S + b \quad (1);$$

$$\varphi(\Delta S) = \tfrac{1}{2}*a*\Delta S^2 + b*\Delta S + c \quad (2);$$

where $\Delta S$ is the distance between the adjacent pixel points in the horizontal direction or the vertical direction, $K_i$ is the curvature of the $i^{th}$ pixel point, $\varphi$ is an included angle between a tangent vector and the X axis, and a, b and c are constant that are respectively calculated according to the curvatures of the adjacent discrete sampling points and boundary conditions.

The calculations of the values of a, b and c belong to the prior art, and will not be described herein.

In a step 1c, the three-dimension spatial coordinate of each of the pixel points is calculated.

Specifically, the three-dimension spatial coordinate (X, Y, Z) of each of the pixel points is calculated according to the following equations;

$$X_{i+1} = X_i + \Delta S*\cos(\varphi_i + \Delta S*K_i/2) \quad (3);$$

$$Y_{i+1} = Y_i + \Delta S \quad (4);$$

$$Z_{i+1} = Z_i + \Delta S*\sin(\varphi_i + \Delta S*K_i/2) \quad (5);$$

where $\Delta S$ is arc length of the image capturing zone, $\varphi$ is the included angle between the tangent vector and the X axis, and K is the curvature of the pixel point in the curve.

When the curved surface is the fixed curved surface, the three-dimension spatial coordinates of the pixel points in the image capturing zone may be preset, and are acquired by the image detecting module.

In a step 103, the three-dimension spatial coordinates are projected to two-dimensional planar coordinates, and the two-dimensional planar coordinates are generated into an image file according to the image capturing parameters and the color values of the pixel points in the image capturing zone.

Figure 3:
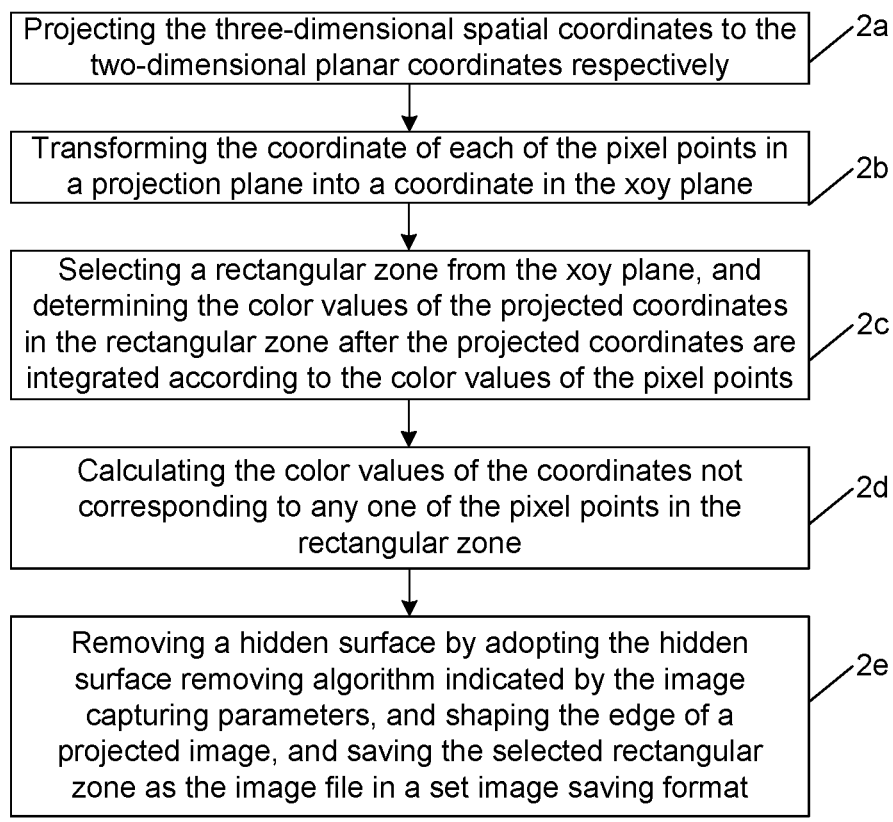
FIG. 3 is a flowchart of generating a three-dimensional spatial coordinate into an image file according to an embodiment of the disclosure.

Specifically, as shown in FIG. 3, the processing flow of generating the two-dimensional spatial coordinates into the image file includes the following steps.

In a step 2a, the three-dimensional spatial coordinates are projected to the two-dimensional planar coordinates.

Specifically, the image processing module adopts a parallel projection algorithm to determine a projection plane according to a projection angle in the image capturing parameters, calculates a homogeneous projection transformation 4×4 matrix T1, and projects the three-dimensional spatial coordinates (X, Y, Z) of the pixel points to the two-dimensional planar coordinates.

Projection of the three-dimensional spatial coordinates to the two-dimensional planar coordinates belongs to the prior art, and will not be repeated here.

In a step 2b, the coordinates of the pixel points in a projection plane are transformed into coordinates in the xoy plane.

Specifically, according to the position of the projection plane, the coordinates of the pixel points in the projection plane are transformed into the coordinates in the xoy plane after two rotation transformations and a translation transformation;

After two rotation transformations of the transformation matrixes $T_2$ and $T_3$, the projection plane is transformed into a plane parallel to the xoy plane. By translating the transformation matrix $T_4$, the projection plane is translated from the plane parallel to the xoy plane to the xoy plane.

The coordinate transformation equation is:

$$(x',y',0,1) = (x,y,z,1) T_1 * T_2 * T_3 * T_4 \quad (6).$$

In a step 2c, a rectangular zone is selected from the xoy plane, and the color values of the projected coordinates in the rectangular zone after the projected coordinates are integrated is determined according to the color values of the pixel point.

The rectangular zone includes the projection coordinates of all the pixel points in the image capturing zone.

The specific values and determination of the color values of the projected coordinates in the rectangular zone after the projected coordinates are integrated belongs to the prior art, and will not be repeated here.

In a step 2d, the color values of the coordinates not corresponding to any of the pixel points in the rectangular zone are calculated.

Specifically, the color values of the coordinates not corresponding to any of pixel points in the rectangular zone are calculated according to an image interpolation algorithm.

In a step 2e, a hidden surface is removed by adopting the hidden surface removing algorithm indicated by the image capturing parameters, and the edge of a projected image is shaped, and the selected rectangular zone is saved as the image file in a set image saving format.

The hidden surface removing algorithm may be a depth buffer algorithm.

Figure 4:
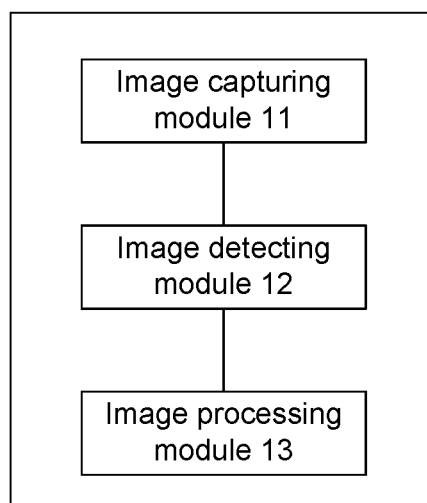
FIG. 4 is a structure diagram of a device for capturing an image according to an embodiment of the disclosure.

To realize the method for capturing an image, the embodiment of the disclosure also provides a device for capturing an image. As shown in FIG. 4, the device includes an image capturing module 11, an image detecting module 12 and an image processing module 13.

The image capturing module 11 is configured to receive the image capturing instruction, and acquire the image capturing zone and the image capturing parameters according to the image capturing instruction.

The image detecting module 12 is configured to measure the at least one bending parameter of the image capturing zone. When the image capturing zone is determined as the curved surface according to the at least one bending parameter, the image detecting module 12 acquires the three-dimensional spatial coordinates of pixel points in the image capturing zone and color values of the pixel points in the image capturing zone.

The image processing module 13 is configured to project the three-dimensional spatial coordinates to the two-dimensional planar coordinates, and generate the two-dimensional planar coordinates into an image file according to the image capturing parameters and the color values of the pixel points in the image capturing zone.

In the above solution, the image detecting module 12 is specifically configured to obtain the curved surface equation of the image capturing zone by performing interpolation fitting on the image capturing zone according to the at least one bending parameter, and calculate the three-dimensional spatial coordinates of the pixel points in the image capturing zone according to the curved surface equation. In the above solution, the image processing module 13 is specifically configured to project the three-dimensional spatial coordinates to the two-dimensional planar coordinates according to the image capturing parameters.

The image processing module 13 is specifically configured to, according to the color values of the pixel points in the image capturing zone, generate the two-dimensional planar coordinates into the image file through the hidden surface removing algorithm and the rendering algorithm indicated by the image capturing parameters.

Here, when the screen for displaying the image can be adjusted to be bent, the three-dimensional spatial coordinates of the pixel points in the image capturing zone is acquired in real time.

Here, the image capturing instruction includes: the touch screen gesture, the key combination or other detectable image capturing instructions initiated by a device user. The image capturing parameters are preset in the device of which an image is to be captured. The image capturing parameters include the three-dimensional image projection algorithm, the projection angle, the rendering algorithm, and so on.

Here, the image detecting module 12 may be provided on the surface or edge of the device screen. The unit of the image detecting module for measuring the at least one bending parameter of the image capturing zone may be the linear bending sensing unit, the strain gauge sensing unit and the optical fiber curvature sensing unit. When the unit for measuring the at least one bending parameter of the image capturing zone is the linear bending sensing unit and the strain gauge sensing unit, the at least one bending parameter of the image capturing zone is measured according to the change of resistance value of the linear bending sensing unit and the strain gauge sensing unit. When the unit for measuring the at least one bending parameter of the image capturing zone is the optical fiber curvature sensing unit, the at least one bending parameter is the curvature and torsion angle.

Here, the image capturing module 11 includes: the monitoring unit and the serving unit. The monitoring unit is configured to monitor the image capturing instruction, encapsulate the monitored image capturing instruction into the image capturing message, and then send the message to the serving unit. The serving unit is configured to parse the image capturing message, and acquire the image capturing zone and the image capturing parameters from the image capturing instruction.

The image capturing module 11, the image detecting module 12 and the image processing module 13 in the device for capturing an image provided by the embodiment of the disclosure may be realized by a processor, or a specific logic circuit. The processor may be a processor on a mobile terminal or a server. In practical application, the processor may be a Central Processing Unit (CPU), a Micro Processing Unit (MPU), a Digital Signal Processor (DSP), a Field Programmable Gate Array (FPGA), or the like.

In the embodiment of the disclosure, if the method for capturing an image is implemented by software function modules, and the software function modules are sold or used as independent products, the software function modules may be stored in a computer readable storage medium. Based on this understanding, the technical solutions in the embodiments of the disclosure substantially or the part making a contribution to the traditional art can be embodied in the form of software product. The computer software product is stored in a storage medium and includes a number of instructions to make a computer device (which may be a personal computer, a server or a network device, etc.) perform all or part of the method in each embodiment of the disclosure. The above storage medium includes: a universal serial bus (USB) flash disk, a mobile hard disk, a read only memory (ROM), a magnetic disk or a compact disc, and other media which can store program codes. In this way, the disclosure is not limited to any particular combination of hardware and software.

Correspondingly, the embodiment of the disclosure also provides a computer storage medium having stored therein a computer program for performing the method for capturing an image.

The above is only the preferred embodiments of the disclosure and not intended to limit the scope of protection of the disclosure.

What is claimed is:

1. A method for capturing an image, comprising:
   receiving an image capturing instruction, and acquiring an image capturing zone and image capturing parameters according to the image capturing instruction;
   measuring at least one bending parameter of the image capturing zone, and when the image capturing zone is determined as a curved surface according to the at least one bending parameter, acquiring three-dimensional spatial coordinates of pixel points in the image capturing zone and color values of the pixel points in the image capturing zone; and
   projecting the three-dimensional spatial coordinates to two-dimensional planar coordinates, and generating the two-dimensional planar coordinates into an image file according to the image capturing parameters and the color values of the pixel points in the image capturing zone.

2. The method for capturing an image according to claim 1, wherein acquiring the three-dimensional spatial coordinates of the pixel points in the image capturing zone comprises:
   obtaining a curved surface equation of the image capturing zone by performing interpolation fitting on the image capturing zone according to the at least one bending parameter, and calculating the three-dimensional spatial coordinates of the pixel points in the image capturing zone according to the curved surface equation.

3. The method for capturing an image according to claim 1, wherein projecting the three-dimensional spatial coordinates to the two-dimensional planar coordinates comprises:
   projecting the three-dimensional spatial coordinates to the two-dimensional planar coordinates according to the image capturing parameters.

4. The method for capturing an image according to claim 1, wherein generating the two-dimensional planar coordinates into the image file according to the image capturing parameters and the color values of the pixel points in the image capturing zone comprises:
   generating the two-dimensional planar coordinates into the image file through a hidden surface removing algorithm and a rendering algorithm indicated by the image capturing parameters, according to the color values of the pixel points in the image capturing zone.

5. The method for capturing an image according to claim 1, wherein when a screen for displaying the image can be adjusted to be bent, acquiring the three-dimensional spatial coordinates of the pixel points in the image capturing zone in real time.

6. A device for capturing an image, comprising:
   a processor; and
   a memory for storing instructions executable by the processor,
   wherein the processor is configured to:
   receive an image capturing instruction, and acquire an image capturing zone and image capturing parameters according to the image capturing instruction;
   measure at least one bending parameter of the image capturing zone, and when the image capturing zone is determined as a curved surface according to the at least one bending parameter, acquire three-dimensional spatial coordinates of pixel points in the image capturing zone and color values of the pixel points in the image capturing zone; and project the three-dimensional spatial coordinates to two-dimensional planar coordinates, and generate the two-dimensional planar coordinates into an image file according to the image capturing parameters and the color values of the pixel points in the image capturing zone.

7. The device for capturing an image according to claim 6, wherein the processor is configured to obtain a curved surface equation of the image capturing zone by performing interpolation fitting on the image capturing zone according to the at least one bending parameter, and calculate the three-dimensional spatial coordinates of the pixel points in the image capturing zone according to the curved surface equation.

8. The device for capturing an image according to claim 6, wherein the processor is configured to project the three-dimensional spatial coordinates to the two-dimensional planar coordinates according to the image capturing parameters.

9. The device for capturing an image according to claim 6, wherein the processor is configured to, according to the color values of the pixel points in the image capturing zone, generate the two-dimensional planar coordinates into the image file through a hidden surface removing algorithm and a rendering algorithm indicated by the image capturing parameters.

10. The device for capturing an image according to claim 6, wherein when a screen for displaying the image can be adjusted to be bent, the three-dimensional spatial coordinates of the pixel points in the image capturing zone are acquired in real time.

11. A non-transitory computer-readable storage medium having stored therein computer executable instructions for performing a method for capturing an image, comprising:

receiving an image capturing instruction, and acquiring an image capturing zone and image capturing parameters according to the image capturing instruction;

measuring at least one bending parameter of the image capturing zone, and when the image capturing zone is determined as a curved surface according to the at least one bending parameter, acquiring three-dimensional spatial coordinates of pixel points in the image capturing zone and color values of the pixel points in the image capturing zone; and projecting the three-dimensional spatial coordinates to two-dimensional planar coordinates, and generating the two-dimensional planar coordinates into an image file according to the image capturing parameters and the color values of the pixel points in the image capturing zone.

12. The method for capturing an image according to claim 2, wherein projecting the three-dimensional spatial coordinates to the two-dimensional planar coordinates comprises:

projecting the three-dimensional spatial coordinates to the two-dimensional planar coordinates according to the image capturing parameters.

13. The method for capturing an image according to claim 2, wherein generating the two-dimensional planar coordinates into the image file according to the image capturing parameters and the color values of the pixel points in the image capturing zone comprises:

generating the two-dimensional planar coordinates into the image file through a hidden surface removing algorithm and a rendering algorithm indicated by the image capturing parameters, according to the color values of the pixel points in the image capturing zone.

14. The method for capturing an image according to claim 2, wherein when a screen for displaying the image can be adjusted to be bent, acquiring the three-dimensional spatial coordinates of the pixel points in the image capturing zone in real time.

15. The device for capturing an image according to claim 7, wherein the processor is configured to project the three-dimensional spatial coordinates to the two-dimensional planar coordinates according to the image capturing parameters.

16. The device for capturing an image according to claim 7, wherein the processor is configured to, according to the color values of the pixel points in the image capturing zone, generate the two-dimensional planar coordinates into the image file through a hidden surface removing algorithm and a rendering algorithm indicated by the image capturing parameters.

17. The device for capturing an image according to claim 7, wherein when a screen for displaying the image can be adjusted to be bent, the three-dimensional spatial coordinates of the pixel points in the image capturing zone are acquired in real time.

18. The non-transitory computer-readable storage medium according to claim 11, wherein acquiring the three-dimensional spatial coordinates of the pixel points in the image capturing zone comprises:

obtaining a curved surface equation of the image capturing zone by performing interpolation fitting on the image capturing zone according to the at least one bending parameter, and calculating the three-dimensional spatial coordinates of the pixel points in the image capturing zone according to the curved surface equation.

19. The non-transitory computer-readable storage medium according to claim 11, wherein projecting the three-dimensional spatial coordinates to the two-dimensional planar coordinates comprises:

projecting the three-dimensional spatial coordinates to the two-dimensional planar coordinates according to the image capturing parameters.

20. The non-transitory computer-readable storage medium according to claim 11, wherein generating the two-dimensional planar coordinates into the image file according to the image capturing parameters and the color values of the pixel points in the image capturing zone comprises:

generating the two-dimensional planar coordinates into the image file through a hidden surface removing algorithm and a rendering algorithm indicated by the image capturing parameters, according to the color values of the pixel points in the image capturing zone.

* * * * *